(12) United States Patent
Uehara

(10) Patent No.: US 8,526,814 B2
(45) Date of Patent: Sep. 3, 2013

(54) MULTIPLE INPUT/OUTPUT WAVELENGTH SELECTIVE SWITCH DEVICE

(75) Inventor: Noboru Uehara, Aichi (JP)

(73) Assignee: Santec Corporation, Komaki (JP)

( * ) Notice: Subject to any disclaimer, the term of this patent is extended or adjusted under 35 U.S.C. 154(b) by 215 days.

(21) Appl. No.: 12/896,982

(22) Filed: Oct. 4, 2010

(65) Prior Publication Data

US 2011/0318006 A1    Dec. 29, 2011

(30) Foreign Application Priority Data

Jun. 23, 2010    (JP) .................................. 2010-142646

(51) Int. Cl.
*H04J 14/00*    (2006.01)

(52) U.S. Cl.
USPC .............................................. 398/50; 398/56

(58) Field of Classification Search
CPC .................................................. H04Q 11/0001
USPC ...................................................... 398/50, 56
See application file for complete search history.

(56) References Cited

U.S. PATENT DOCUMENTS

| 2008/0138068 A1 | 6/2008 | Akiyama et al. |
| 2009/0232447 A1* | 9/2009 | Boduch ............................ 385/24 |
| 2010/0086301 A1* | 4/2010 | Fujita et al. ....................... 398/48 |

* cited by examiner

*Primary Examiner* — Shi K Li
(74) *Attorney, Agent, or Firm* — McGlew and Tuttle, P.C.

(57) ABSTRACT

A multiple input/output wavelength selective switch device 1 is configured of an N×M optical cross connect switch 10, wavelength selector 20 and controller 40. The N×M optical cross connect switch 10 turns WDM signals of N channels inputted to input routes Rin1 to RinN into M WDM signals. The wavelength selector 20 can perform a selection operation with respect to each of the M WDM signals according to their wavelengths and output the signals from output routes Rout1 to RoutM.

6 Claims, 14 Drawing Sheets

F I G. 1
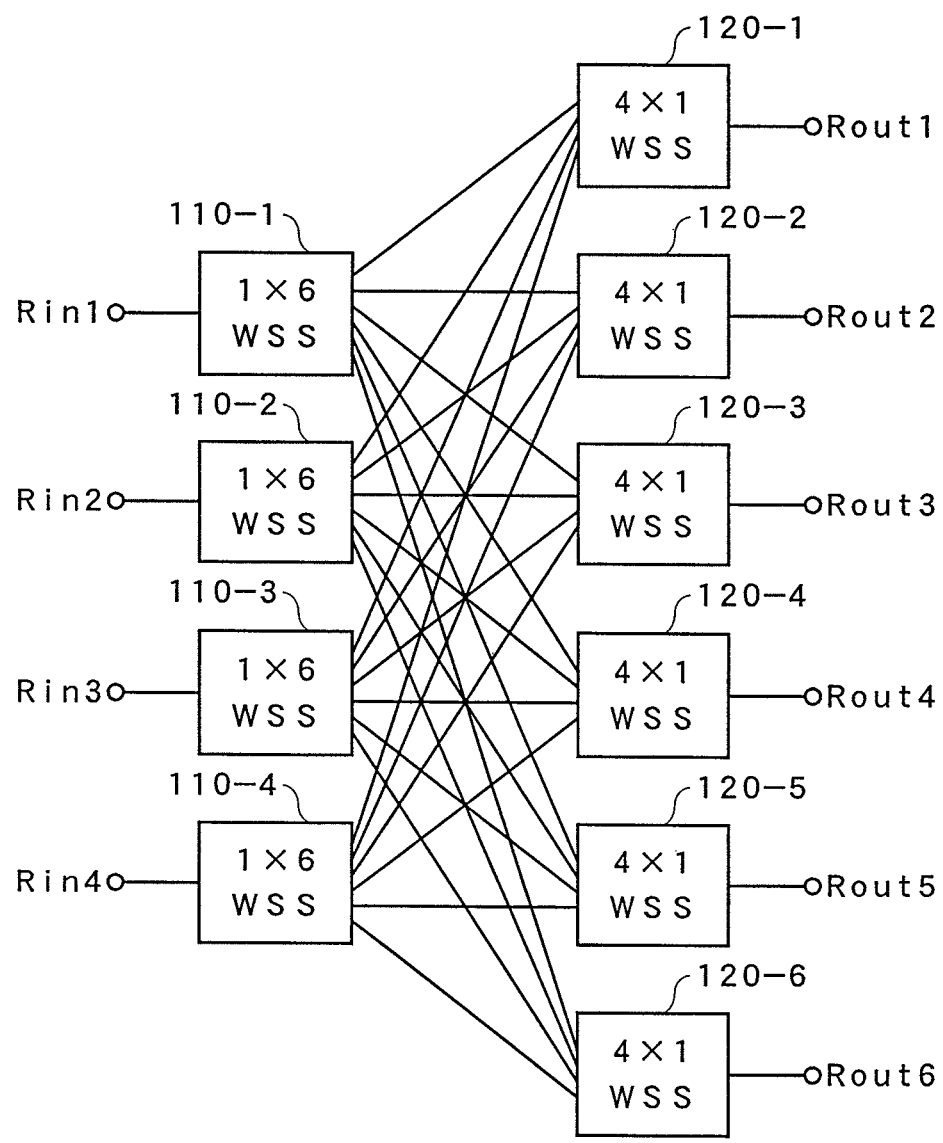

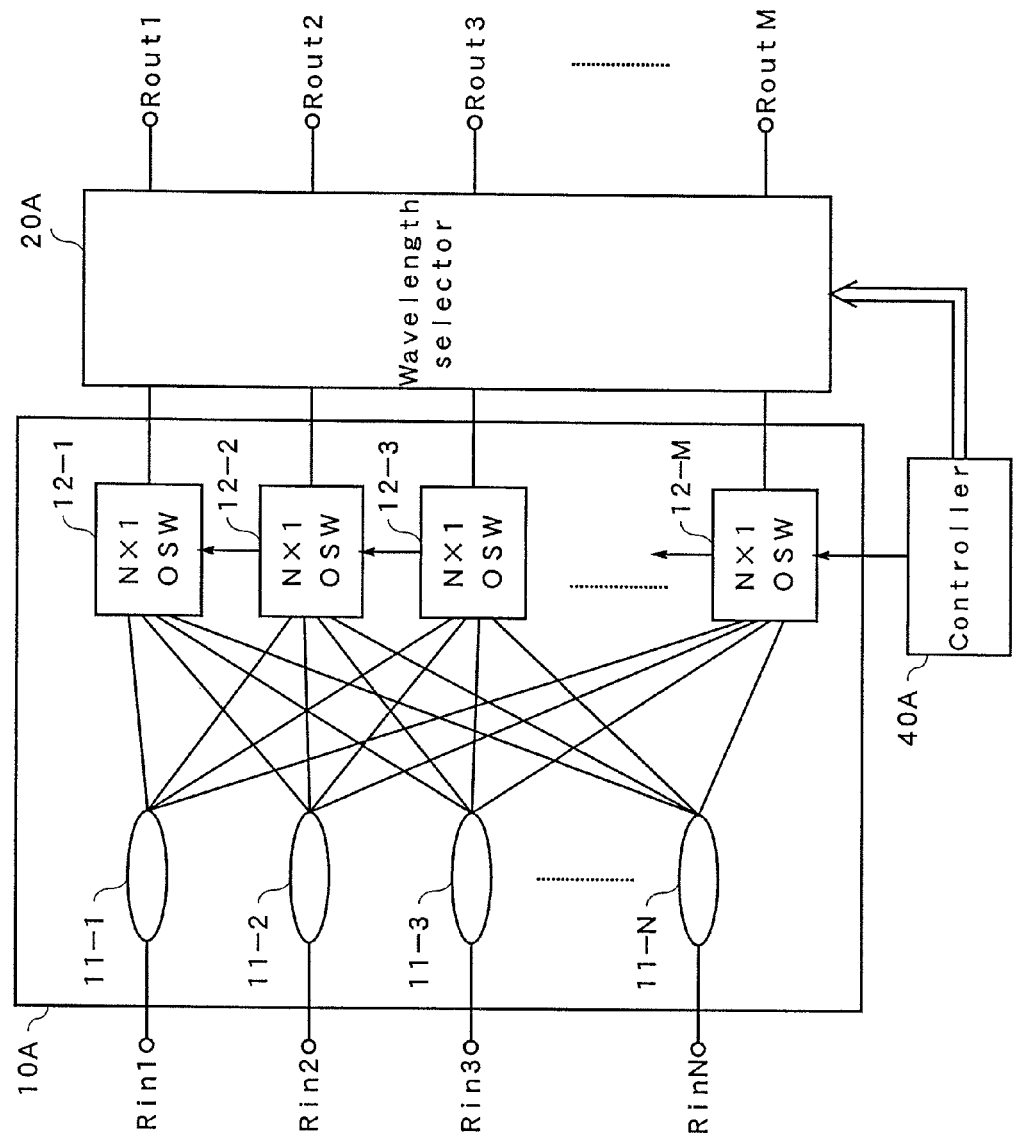

FIG. 4B
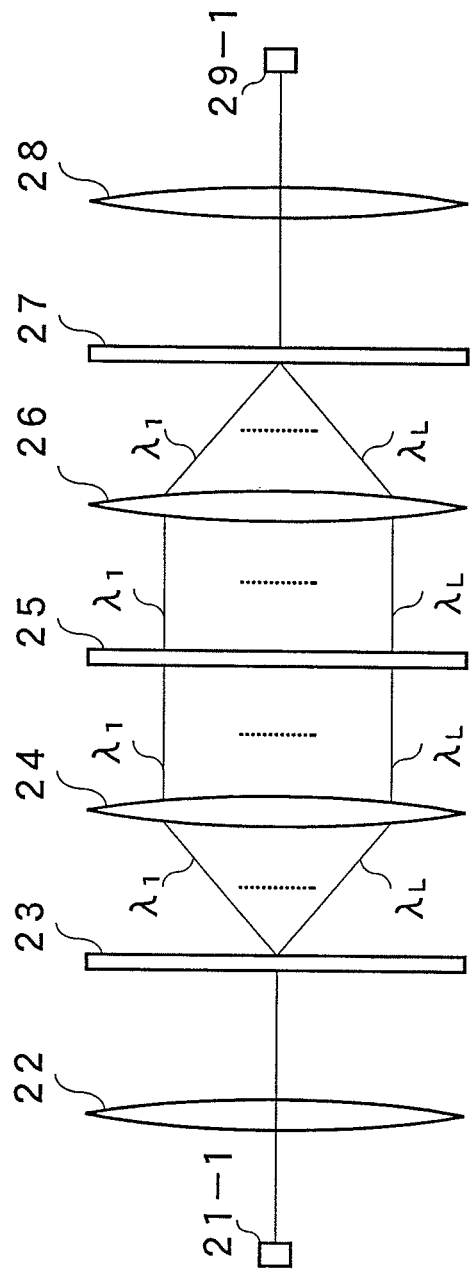
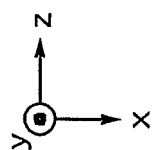

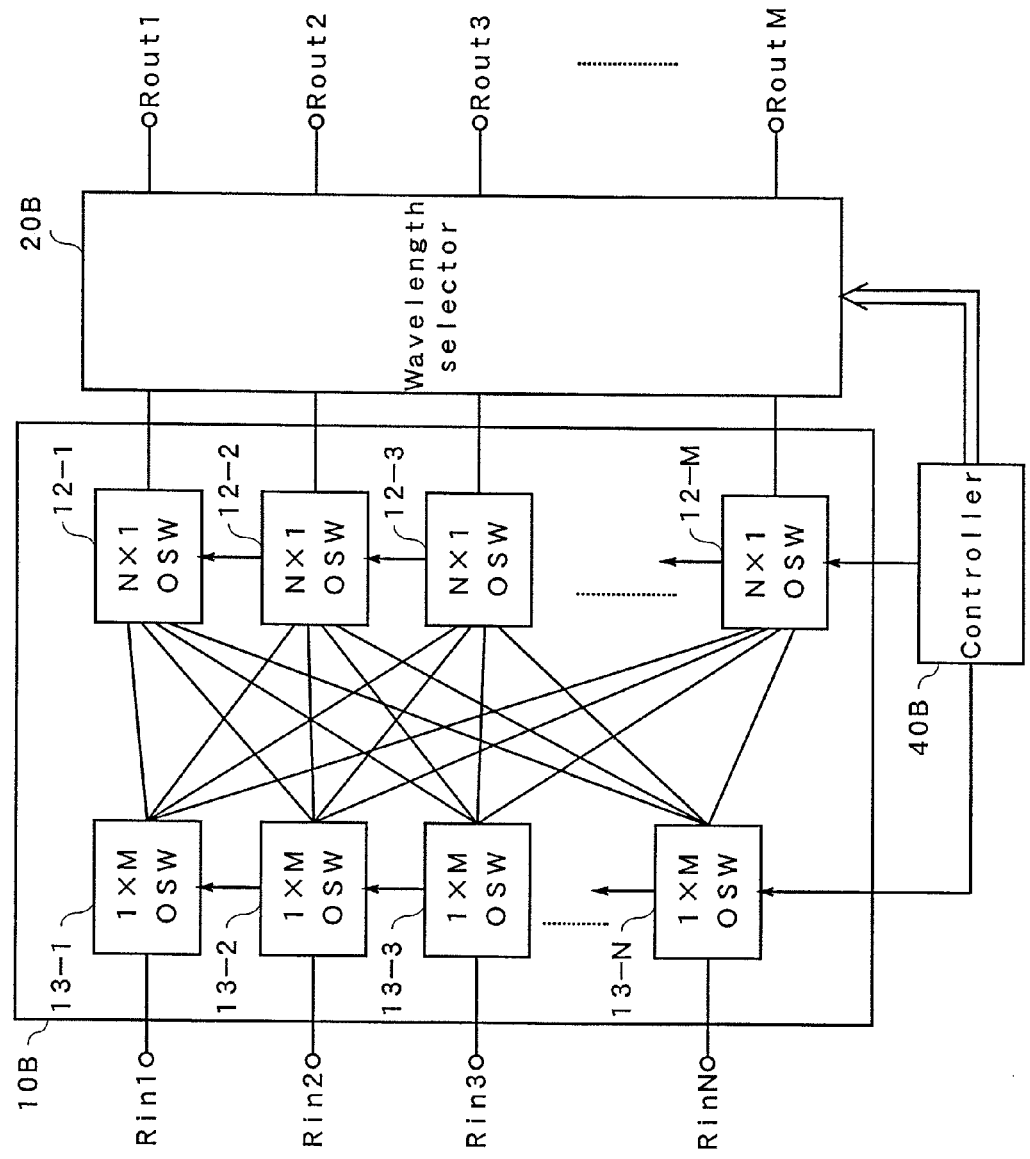

F I G. 1 3
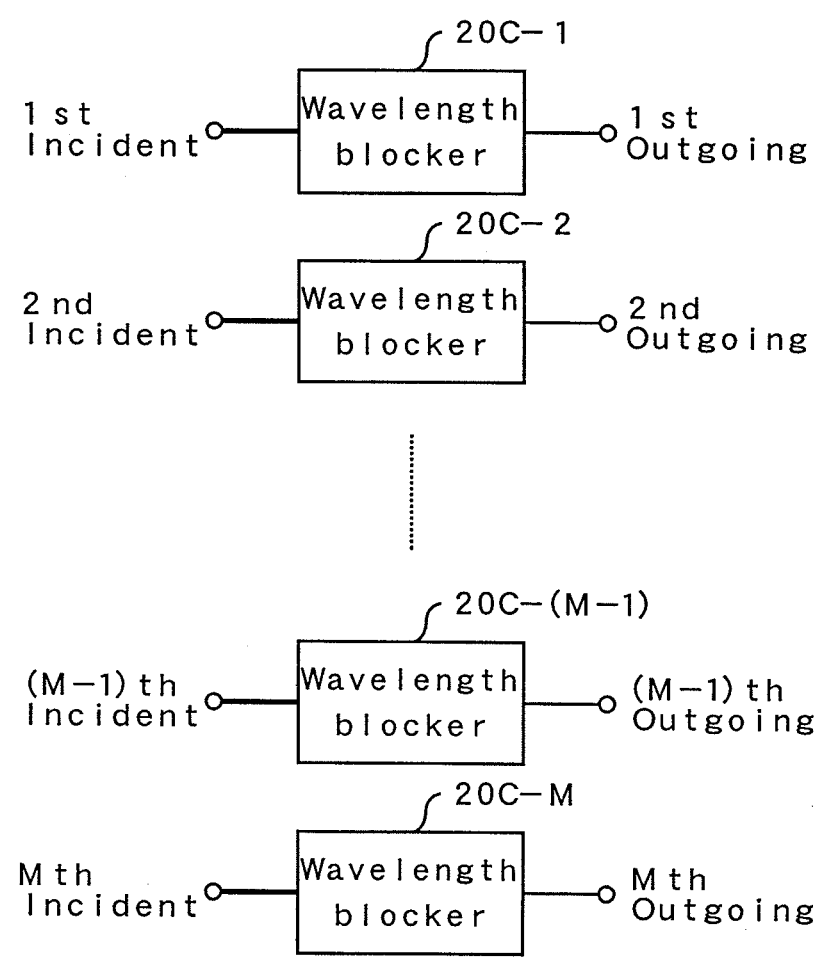

MULTIPLE INPUT/OUTPUT WAVELENGTH SELECTIVE SWITCH DEVICE

BACKGROUND OF THE INVENTION

1. Field of the Invention

The present invention relates to a multiple input/output wavelength selective switch device having a plurality of input and output routes provided at an optical node corresponding to a branch point in an optical network in an optical telecommunications field.

2. Discussion of the Related Art

A wavelength division multiplexing optical communication technique is applied to a high-speed and large-capacity optical network that supports today's advanced information-telecommunication society. A ROADM (Reconfigurable Optical Add Drop Multiplexer) device having a reconfigurable add-drop function has been introduced to the optical node corresponding to the branch point in the optical network. To realize the ROADM device, a wavelength selective switch (also referred to as WSS) for switching a desired wavelength to a desired direction has received attention. At present, the wavelength selective switch having the number of input routes N of 1 and the number of output routes M of 2 or more is used. However, to achieve a large-capacity network in future, the node performance is required to improve, and there is a demand for a multiple input/output wavelength selective switch device in which both the number of input routes and the number of output routes are plural.

According to a conventional method, as disclosed in US2008/0138068, it is possible to realize a multiple input/output wavelength selective switch device including N number of 1×M wavelength selective switches connected to input routes and M number of N×1 wavelength selective switches each receiving outputs of the 1×M wavelength selective switches. FIG. 1 is a diagram showing an example of the multiple input/output wavelength selective switch device in which the number of input routes N is four and the number of output routes M is six. In this figure, the multiple input/output wavelength selective switch device has four 1×6 wavelength selective switches (WSS) 110-1 to 110-4 connected to input routes Rin1 to Rin4. Outputs of each of the wavelength selective switches 110-1 to 110-4 are inputted to each of six 4×1 wavelength selective switches 120-1 to 120-6, and selected outputs are outputted from output routes Rout1 to Rout6. Thus, the multiple input/output wavelength selective switch device can be realized.

However, because the wavelength selective switch has a complicated structure, a device area is so large that it cannot be easily mounted on an optical mount board, resulting in an increase in device price. In the configuration shown in this figure, since (N+M) wavelength selective switches are used, disadvantageously, a failure rate is high and transmission reliability is low.

Thus, to realize compact multiple input/output wavelength selective switch with a small number of parts, US2008/0138068 proposes use of a plurality of 2×N wavelength selective switches utilizing inclination of an MEMS (Micro Electric Mechanical System) minute mirror.

SUMMARY OF THE INVENTION

However, according to this approach, the number of input routes N must be equal to the number of output routes M. Also in this case, because 2N wavelength selective switches are used, as compared to the case where one wavelength selective switch is used, a failure rate is as high as 2N times and transmission reliability is lowered. Further, there is a disadvantage that the switches are essentially vulnerable to external perturbations such as vibrations and shocks since a mirror such as MEMS is mechanically driven.

In consideration of such conventional problems, the present invention intends to achieve a compact mounting area and improve the transmission reliability without using a conventional wavelength selective switch and movable parts such as MEMS.

To solve the problems, a multiple input/output wavelength selective switch device of the present invention for inputting wavelength division multiplexing optical signals (hereinafter referred as WDM signals) of first to $N^{th}$ channels, the signals each having wavelengths $\lambda_1$ to $\lambda_L$ (L is a natural number of 2 or more), to N input routes (N is a natural number of 2 or more) and outputting the wavelength multiplexing optical signals of desired channels from M output routes (M is a natural number of 2 or more) comprises: an optical cross connect switch for outputting desired M WDM light beams among the WDM signals of N channels inputted to the N input routes; and a wavelength selector for receiving inputs of the M outputs from said optical cross connect switch, selecting an optical signal of desired wavelengths with respect to each of the inputted WDM signals and outputting the selected signals as M WDM signals, wherein said optical cross connect switch includes: N splitters for branching each of the WDM signals inputted to said input routes into M outputs; and M (N×1) optical switches each for receiving inputs of all outputs of said splitters and selecting one of the inputs.

In the multiple input/output wavelength selective switch device, said wavelength selector may include: a first dispersion element arranged along a direction of a y axis, the element spatially dispersing first to $M^{th}$ WDM signal light beams having a plurality of wavelengths according to their wavelengths; a first light condensing element for condensing the WDM light beam of each channel dispersed by said first dispersion element into parallel light beam; a wavelength selection element having a multiplicity of pixels arranged in a direction of an x axis according to wavelength, the pixels being placed so as to receive M WDM light beams arranged at different positions with respect to the y axis so as to be developed over an xy plane and being arranged in a lattice pattern on the xy plane, and the wavelength selection element selecting light in desired wavelength bands with respect to desired WDM signals by changing transmission characteristics of each of the pixels arranged in a two-dimensional fashion; a wavelength selection element driving unit for driving electrodes arranged in xy directions of said wavelength selection element to control light transmission characteristics of a pixel lying at a predetermined position in the x-axis direction as well as in the y-axis direction; a second light condensing element for condensing light beams of different wavelengths transmitted through said wavelength selection element; and a second wavelength dispersion element for synthesizing dispersed light condensed by said second light condensing element.

In the multiple input/output wavelength selective switch device, said wavelength selection element may be an LCOS element.

In the multiple input/output wavelength selective switch device said wavelength selection element may be a two-dimensional liquid crystal array element.

In the multiple input/output wavelength selective switch device, said wavelength selector may include: a plurality of entrance/exit section arranged along a direction of a y axis, the entrance/exit section receiving first to Mth WDM signal light beams, each of which is composed of multiple-wavelength light, and exiting optical signals of selected wavelengths on a channel to channel basis; a wavelength dispersion element for spatially dispersing the M WDM signal light beams obtained from said entrance/exit section according to their wavelengths; a light condensing element for condensing the WDM signal light beams of different channels dispersed by said wavelength dispersion element on a two-dimensional xy plane; a wavelength selection element having a multiplicity of pixels arranged in a direction of an x axis according to wavelength, the pixels being placed so as to receive M WDM light beams arranged at different positions with respect to the y axis so as to be developed over the xy plane and being arranged in a lattice pattern on the xy plane, and the wavelength selection element selecting light in desired wavelength bands with respect to desired WDM signals by changing reflection characteristics of each of the pixels arranged in a two-dimensional fashion; and a wavelength selection element driving unit for driving an electrode of each of the pixels arranged in xy directions of said wavelength selection element to control light reflection characteristics of a pixel lying at a predetermined position in the x-axis direction as well as in the y-axis direction.

In the multiple input/output wavelength selective switch device, said wavelength selection element may be an LCOS element.

In the multiple input/output wavelength selective switch device, said wavelength selection element may be a two-dimensional liquid crystal array element.

In the multiple input/output wavelength selective switch device, said wavelength selector may be a wavelength blocker.

To solve the problems, a multiple input/output wavelength selective switch device of the present invention for inputting wavelength multiplexing optical signals of first to $N^{th}$ channels (N is a natural number of 2 or more), the signals each having wavelengths $\lambda_1$ to $\lambda_L$, to N input routes (N is a natural number of 2 or more) and outputting wavelength multiplexing optical signals of desired channels from M output routes (M is a natural number of 2 or more) comprises: an optical cross connect switch for outputting desired M WDM light beams among the WDM signals of N channels inputted to the N input routes; and a wavelength selector for receiving inputs of the M outputs from said optical cross connect switch, selecting optical signals of desired wavelengths with respect to the inputted WDM signals and outputting the selected signals as M WDM signals, wherein said optical cross connect switch includes: N (1×M) optical switches each for selecting one of the WDM signals of N channels inputted to said input routes; and M (N×1) optical switches each for receiving inputs of all outputs of said 1×M optical switches and selecting one of the inputs.

In the multiple input/output wavelength selective switch device, said wavelength selector may include: a first dispersion element arranged along a direction of a y axis, the element spatially dispersing first to $M^{th}$ WDM signal light beams having a plurality of wavelengths according to their wavelengths; a first light condensing element for condensing the WDM light beam of each channel dispersed by said first dispersion element into parallel light beam; a wavelength selection element having a multiplicity of pixels arranged in a direction of an x axis according to wavelength, the pixels being placed so as to receive M WDM light beams arranged at different positions with respect to the y axis so as to be developed over an xy plane and being arranged in a lattice pattern on the xy plane, and selecting light in desired wavelength bands with respect to desired WDM signals by changing transmission characteristics of each of the pixels arranged in a two-dimensional fashion; a wavelength selection element driving unit for driving electrodes arranged in xy directions of said wavelength selection element to control light transmission characteristics of a pixel lying at a predetermined position in the x-axis direction as well as in the y-axis direction; a second light condensing element for condensing light beams of different wavelengths transmitted through said wavelength selection element; and a second wavelength dispersion element for synthesizing dispersed light beams condensed by said second light condensing element.

In the multiple input/output wavelength selective switch device, said wavelength selector may include: a plurality of entrance/exit section arranged along a direction of a y axis, the entrance/exit section receiving first to $M^{th}$ WDM signal light beams, each of which is composed of multiple-wavelength light, and exiting optical signals of selected wavelengths on a channel to channel basis; a wavelength dispersion element for spatially dispersing M WDM signal light beams obtained from said entrance/exit section according to their wavelengths; a light condensing element for condensing the WDM signal light beams of different channels dispersed by said wavelength dispersion element on a two-dimensional xy plane; a wavelength selection element having a multiplicity of pixels arranged in a direction of an x axis according to wavelength, the pixels being placed so as to receive M WDM light beams arranged at different positions with respect to the y axis so as to be developed over an xy plane and being arranged in a lattice pattern on the xy plane, and the wavelength selection element selecting light in desired wavelength bands with respect to desired WDM signals by changing reflection characteristics of each of the pixels arranged in a two-dimensional fashion; and a wavelength selection element driving unit for driving an electrode of each of the pixels arranged in xy directions of said wavelength selection element to control light reflection characteristics of a pixel lying at a predetermined position in the x-axis direction as well as in the y-axis direction.

As described above in detail, according to the present invention, since the wavelength selective switches are configured as a unit and a plurality of wavelength selective switches are not used, the switch becomes compact, resulting in a small mounting area and reliability is improved. Further, it is possible to provide a multiple input/output wavelength selective switch device that is hard to be affected by external perturbations such as vibrations and shocks without using the movable parts such as MEMS.

BRIEF DESCRIPTION OF THE DRAWINGS

FIG. 1 is a block diagram showing an example of a conventional wavelength selective switch device having four input routes and six output routes;

FIG. 3 is a block diagram showing a multiple input/output wavelength selective switch in accordance with a first embodiment of the present invention;

FIG. 4B is a diagram showing optical arrangement of a wavelength selector in accordance with the first embodiment of the present invention as seen in a y-axis direction;

FIG. 9 is a block diagram showing an example of a multiple input/output wavelength selective switch in accordance with a second embodiment of the present invention;

FIG. 13 is a diagram showing still another example of the wavelength selection element of the present invention.

Figure 2:
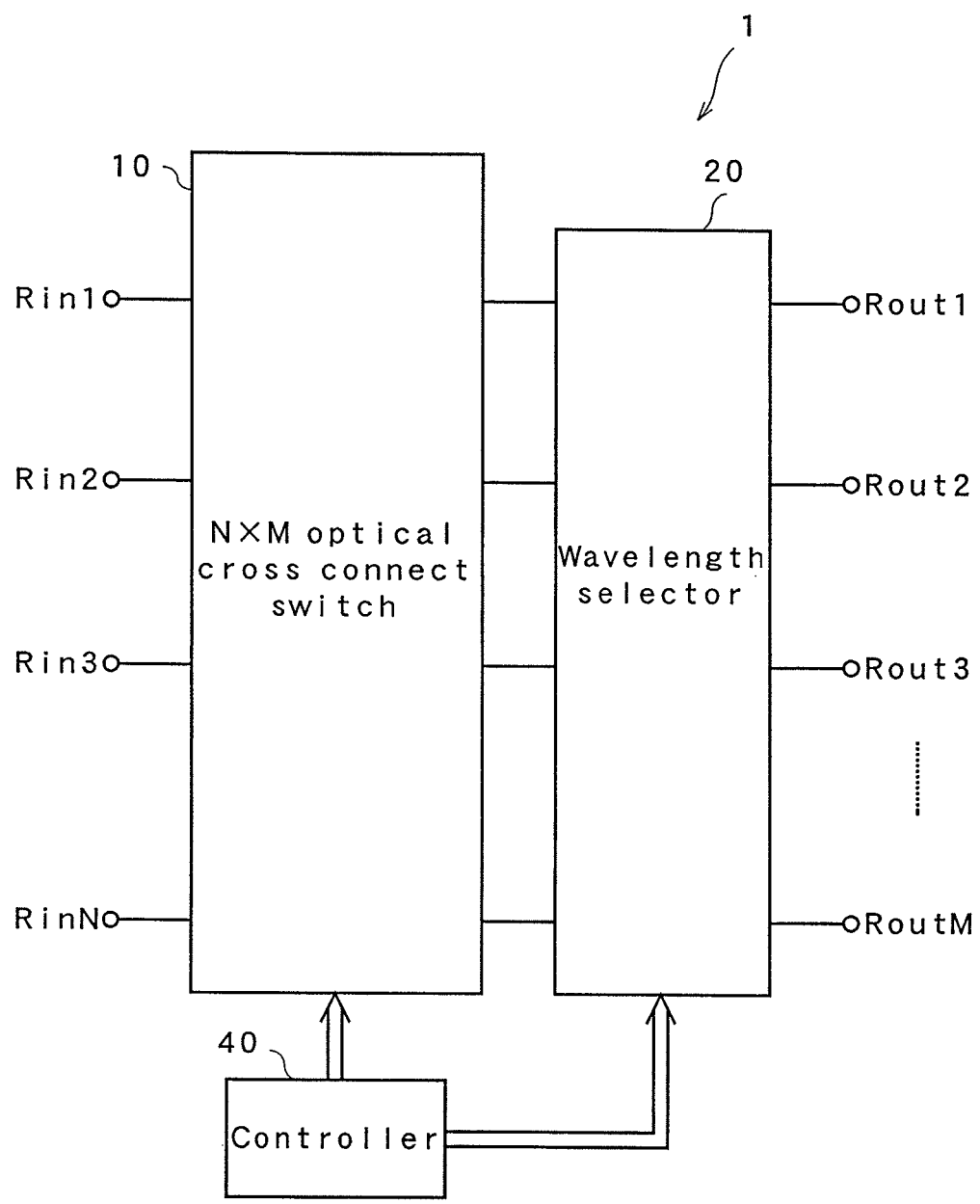
FIG. 2 is a block diagram showing an example of a multiple input/output wavelength selective switch according to a basic configuration of the present invention.

DESCRIPTION OF THE PREFERRED EMBODIMENTS (Basic Configuration of the Present Invention)

Description will be given to a configuration of a multiple input/output wavelength selective switch device according to a basic configuration of the present invention. This switch device 1 includes N (N is a natural number of 2 or more) input routes Rin1 to RinN and M (M is a natural number of 2 or more) output routes Rout1 to RoutM. The switch device 1 is formed of an N×M optical cross connect switch 10, a wavelength selector 20 and a controller 40. Here, it is assumed that optical signals inputted to the input routes Rin1 to RinN are wavelength division multiplexing optical signals (hereinafter referred to as WDM signals) obtained by multiplexing optical signals each having wavelengths $\lambda_1$ to $\lambda_L$ (L is a natural number of 2 or more). The WDM signals of N channels are inputted to the N×M optical cross connect switch 10 directly or via optical fibers. The optical cross connect switch 10 is an optical switch capable of outputting inputted desired WDM signals of N channels as desired M WDM signals according to control of the controller 40. The N×M optical cross connect switch 10 feeds the M WDM signals to the wavelength selector 20.

The wavelength selector 20 separates each of the inputted M WDM signals according to wavelengths $\lambda_1$ to $\lambda_L$, performs a filtering operation to light beams of each wavelength, synthesizes the light beams and outputs the synthesized light beams from the output routes Rout1 to RoutM as the M WDM signals. In this filtering operation, typically, a light beam of a particular wavelength is blocked or transmitted. In addition, an equalizer function to keep a level of transmitted light uniform may be provided.

Next, the controller 40 controls a switching state of the optical cross connect switch 10. The controller 40 also controls a level of each of the WDM signal light beams of respective wavelengths in the wavelength selector 20.

The wavelength selective switch device of the present invention can perform a selection operation with respect to each of the WDM signals inputted to the input routes Rin1 to RinN on a wavelength basis and output the WDM signal to any of the output routes Rout1 to RoutM by using the optical cross connect switch 10 and wavelength selector 20.

First Embodiment

Next, an embodiment of the present invention will be described in more detail. FIG. 3 is a diagram showing a configuration of a multiple input/output wavelength selective switch device in accordance with a first embodiment of the present invention. In this embodiment, the optical cross connect switch 10A is formed of N splitters 11-1 to 11-N and M (N×1) optical switches (expressed as OSW) 12-1 to 12-M. The splitter 11-1 branches the WDM signal of a first channel, which is inputted from the input routes Rin1, into M, and outputs the branched outputs of the first channel to the M optical switches 12-1 to 12-M. Similarly, the splitter 11-2 branches the WDM signal of a second channel, which is inputted from the input routes Rin2, into M and outputs the branched outputs to the M optical switches 12-1 to 12-M. The same also applies to the other splitters 11-3 to 11-N. The optical switches 12-1 to 12-M each select one of inputted WDM signals of N channels inputted based on an output of the controller 40A and output the selected WDM signal to a wavelength selector 20A. Whereby, desired M WDM signals among the WDM signals of N channels, which are inputted to the input routes, can be inputted to the wavelength selector 20A. In this embodiment, since a plurality of WDM signals of the same channel are inputted to the wavelength selector 20A, a multi-cast function can be achieved. The multi-cast function is a function capable of outputting a plurality of WDM signals of the same channel from a plurality of output routes. To reduce the optical cross connect switch 10A in size, the N splitters 11-1 to 11-N and M optical switches 12-1 to 12-M may be formed on a same planar optical waveguide.

Figure 4A:
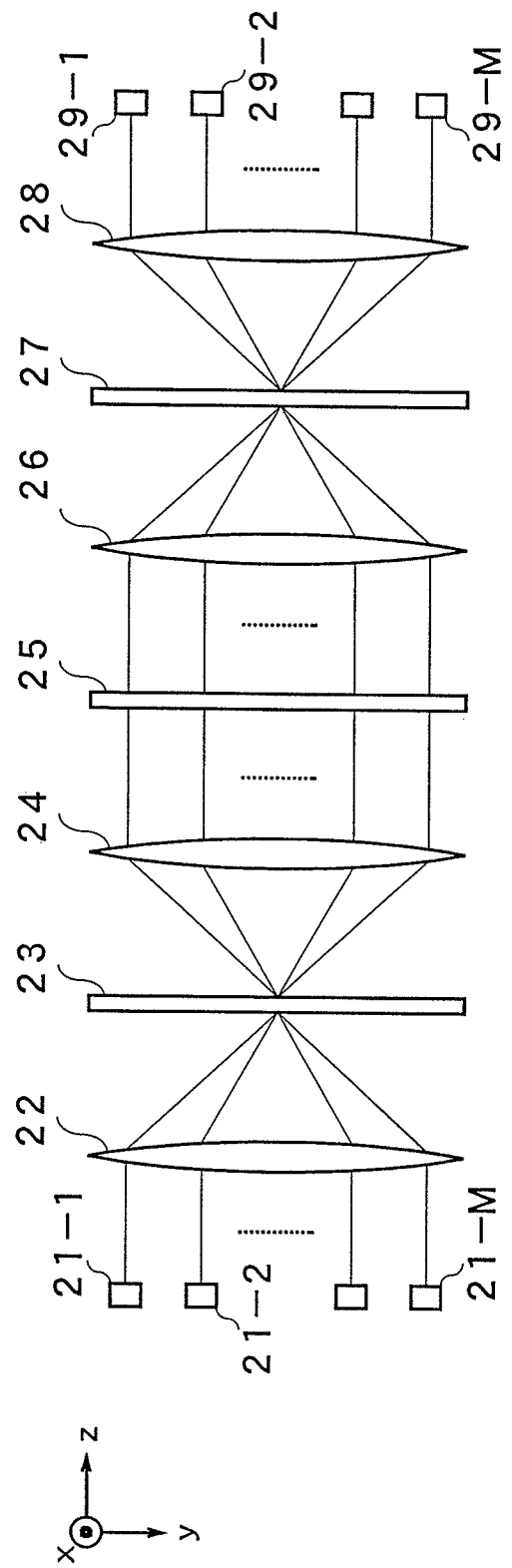
FIG. 4A is a diagram showing optical arrangement of a wavelength selector in accordance with the first embodiment of the present invention as seen in an x-axis direction.

Next, a detailed configuration of the wavelength selector 20A in accordance with this embodiment will be described. Given that incoming light beams are numbered first to $M^{th}$ in FIG. 4, the incoming light beams to the wavelength selector 20A are M WDM signals, entered to respective collimator lenses 21-1 to 21-M and fed to a lens 22 as parallel light beams. The lens 22 condenses the WDM light beams to a spot in a y-axis direction, and a first wavelength dispersion element 23 is provided at a light-condensing position. The first wavelength dispersion element 23 can be configured of a diffraction grating, prism or combination of the diffraction grating and prism. As shown in FIG. 4B, the wavelength dispersion element 23 acts to emit light beams in different directions on an xz plane according to their wavelengths. All of these light beams are incident on a lens 24. The lens 24 is a first light condensing element for condensing light beams dispersed on an xz plane in a direction parallel to a z axis. A wavelength selection element 25 is disposed perpendicularly to an optical axis of the lens 24. The wavelength selection element 25 acts to transmit incoming light in a selective manner, which will be described in detail later. The light transmitted through the wavelength selection element 25 is incident on a lens 26. A pair of the lens 24 and first wavelength dispersion element 23 and a pair of the lens 26 and second wavelength dispersion element 27 are arranged in plane-symmetrical relation with respect to the xy plane at the center of the wavelength selection element 25. The lens 26 is a second light condensing element for condensing the parallel light beams on the xz plane. A second wavelength dispersion element 27 acts to synthesize light beams of different wavelength components, which come from different directions, and emit the synthesized light beams. The light beams synthesized by the second wavelength dispersion element 27 are converted into M WDM light beams that are parallel to the z axis and discrete in the y-axis direction by a lens 28. The WDM light beams are outputted from the output routes Rout1 to RoutM via collimator lenses 29-1 to 29-M.

Figure 5:
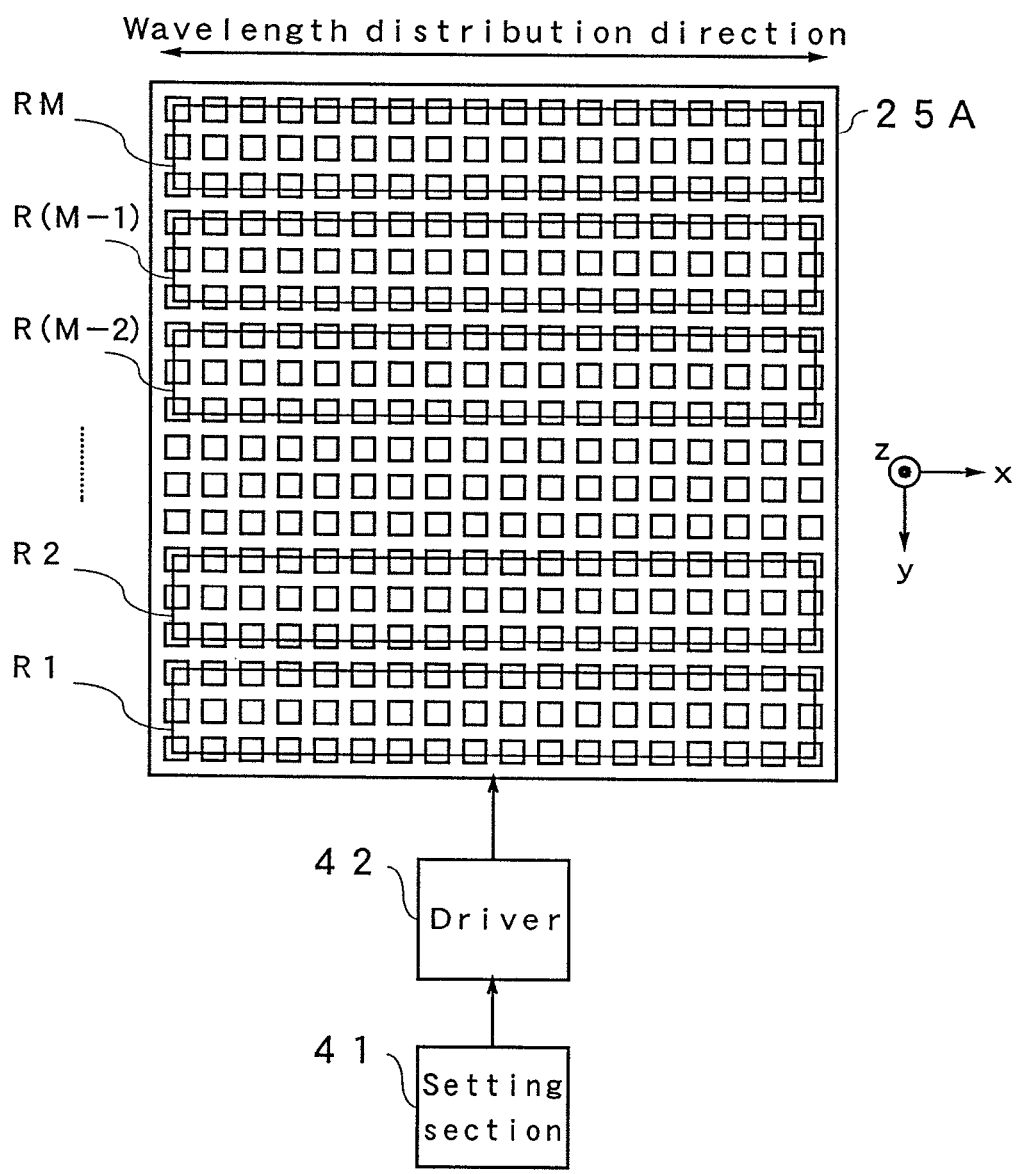
FIG. 5 is a diagram showing an LCOS element employed in the wavelength selector in accordance with this embodiment.

Next, the wavelength selection element 25 employed in the embodiment will be explained. AS shown in FIG. 5, the wavelength selection element 25 is, designed as an element having a structure composed of pixels two-dimensionally arranged in a T by Q dot matrix. Moreover, a setting section 41 is connected, via a driver 42, to the wavelength selection element 25. The setting section 41 determines which pixel is used to transmit light thorough the xy plane in accordance with a selected wavelength of a selected channel. The driver 42 is a a wavelength selection element driving unit for driving an electrode of each of the pixels arranged in xy directions of said wavelength selection element to control light reflection characteristics of a pixel lying at a predetermined position.

When WDM light corresponding to the first to the M-th channels is dispersed in the x-axis direction according to wavelength and also dispersed in the y-axis direction according to channel so as to be incident on the wavelength selection element 25 as M pieces of parallel light beams in a strip-like form, then incident regions R1 to RM for receiving the light beams of the first to the M-th channels are each assumed to be a rectangular region as shown in FIG. 5. That is, the light beams applied to the incident regions R1 to RM are essentially the WDM light beams of the first to the M-th channels developed over the xy plane according to input number i (i=1 to M) and wavelength band $\lambda_j$ (j=1 to L). The wavelength selector 20A can select light having a desired wavelengths by choosing corresponding pixels for transmission.

The wavelength selection element 25 can be practically realized by using an LCOS (Liquid Crystal On Silicon)-based LC element. An LCOS element 25A has a built-in liquid crystal modulation driver 42 located at the back of each pixel. Accordingly, the number of pixels can be increased and thus, for example, the LCOS element 25A can be formed of a multiplicity of pixels arranged in a 1000×1000 lattice pattern. In the LCOS element 25A, since light beams are incident separately at different positions according to channel and wavelength, by bringing a pixel corresponding to the incident position of a target light beam into a transmissive state, it is possible to select the optical signal thereof.

Figure 6A:
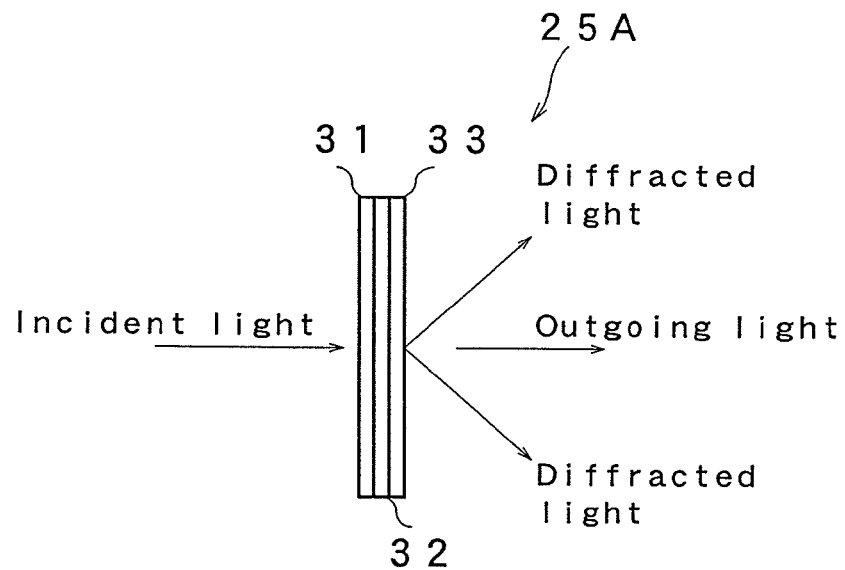
FIG. 6A is a diagram showing an example of a modulating mode for the LCOS element employed in this embodiment.

Now, as one of modulation modes applicable to the LCOS element 25A, a phase modulation mode will be explained. FIG. 6A is a schematic diagram showing the LCOS element. The LCOS element is composed of a transparent electrode 31, a liquid crystal 32, and a transparent electrode 33 that are arranged in the order named, from the plane of incidence's side, along the z-axis direction in a layered structure. In the LCOS element 25A, since a plurality of pixels are assigned to constitute a single wavelength band of one WDM single, it is possible to impart unevenness to a refractive index profile with respect to a plurality of pixels and thereby develop a diffraction phenomenon. Accordingly, by applying a voltage between the transparent electrode 31 and the transparent electrode 33, the angles of diffraction of different frequency components can be controlled independently, so that input light with a specific wavelength can be caused to travel in a straight line in the z-axis direction and eventually pass through the element, and light of another wavelength components can be diffracted as unnecessary light in a direction different from the z-axis direction. Therefore, by controlling a voltage to be applied to each pixel, necessary pixels can be brought into a transmissive state without causing diffraction.

Figure 6B:
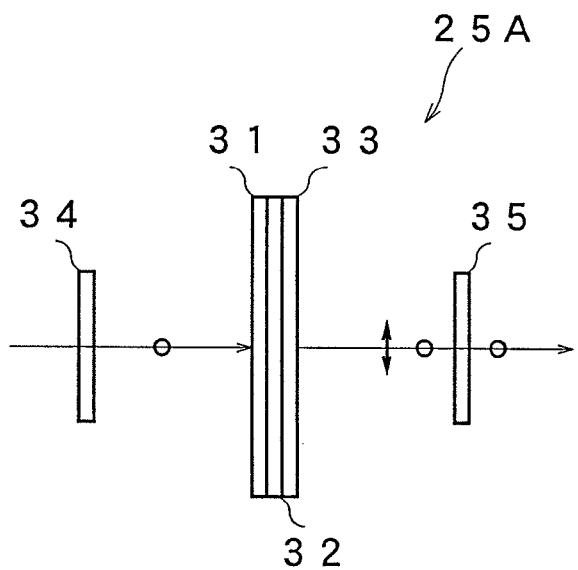
FIG. 6B is a diagram showing another example of the modulating mode for the LCOS element employed in this embodiment.

Next, as another modulation mode applicable to the LCOS element, an intensity modulation mode will be explained. FIG. 6B is a diagram showing a wavelength selection method based on the intensity modulation mode. A polarizer 34 is placed on the plane of incidence for incoming light. The polarizer 34 brings incoming light into a specific polarized state as indicated by a circle in the diagram, and the polarized light is incident on the LCOS element 25A. Also in this case, the LCOS element is composed of a transparent electrode 31, a liquid crystal 32, and a transparent electrode 33. A polarizer 35 is placed on the optical axis of the outgoing light transmitted through the LCOS element. The polarizer 35 allows the exit of only light in a specific polarized state as indicated by the circle in the diagram. With the incidence of light on the LCOS element, a difference in index of double refraction in the liquid crystal between the electrodes can be controlled on the basis of the conditions of voltage application. Accordingly, the polarization state of transmitted light can be varied by adjusting to-be-applied voltages independently. Then, it is determined whether the plane of polarization is rotated or retained at the time of voltage control in accordance with orientational ordering among liquid-crystal molecular components. For example, assuming that the plane of polarization is retained in the absence of voltage application, then the light indicated by the circle is simply transmitted. On the other hand, in the presence of voltage application, the plane of polarization is rotated to effect transmission, and the transmitted light is shielded by the polarizer 35. Therefore the selection of incoming light can be achieved by controlling voltages to be applied to the pixels. The selection of a plurality of given wavelength bands of a plurality of given WDM signal light beams can be made by bringing a given number of corresponding pixels into a transmissive state.

Figure 7A:
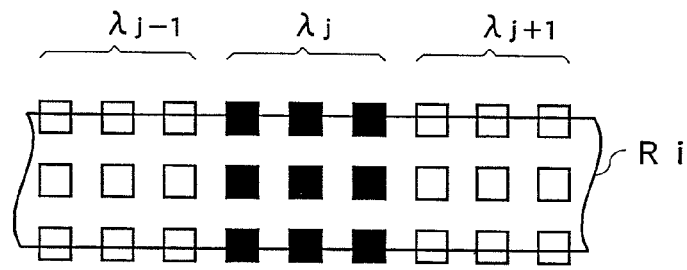
FIGS. 7A to 7D are diagrams showing how the LCOS element is to be driven.
Figure 8A:
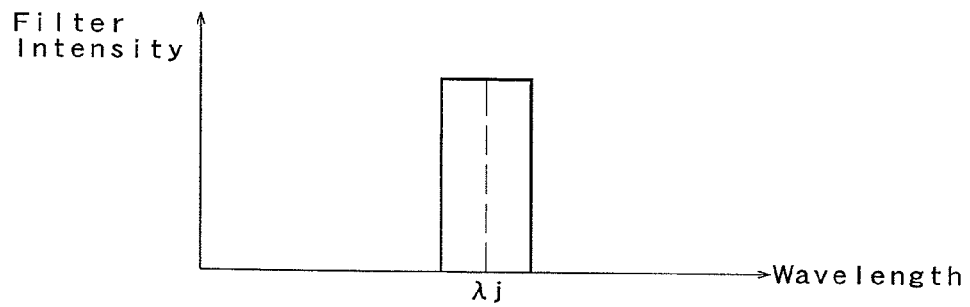
FIGS. 8A to 8D are diagrams showing selection characteristics of a filter corresponding to driving conditions of the LCOS element.

The LCOS element 25A employed in the first embodiment has, for example, a 3M×3L pixel arrangement with respect to WDM signals of M each having L wavelength bands ranging from $\lambda_1$ to $\lambda_L$. In this way, when it is desired to select a specific wavelength of a WDM signal corresponding to a specific channel, for example, a signal in a wavelength band $\lambda_j$ of WDM light corresponding to an i-th input as shown in FIG. 7A, by bringing 9 dots of pixels, namely 3i to 3i+2 and 3j to 3j+2, into a transmissive state, the wavelength of the number can be selected. In FIG. 7A, a pixel to be brought into a transmissive state is represented as a black box. When light is incident on a pixel in a transmissive state of the LCOS element 25A, then the incident light is simply transmitted through the output side. Meanwhile, light with a non-target wavelength incident on an unselected pixel is diffracted or shielded and is therefore no longer output. Thus, in the case of selecting 9 pixels corresponding to a specific wavelength band, as shown in FIG. 8A, as a filter configuration, there is obtained a flat-top type spectral waveform pattern characterized by inclusion of signal spectral components and low crosstalk between adjacent channels.

Figure 7B:
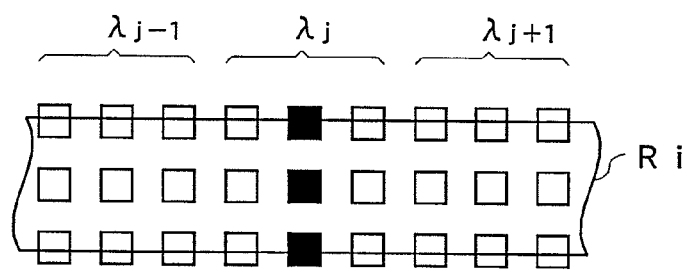
Figure 8B:
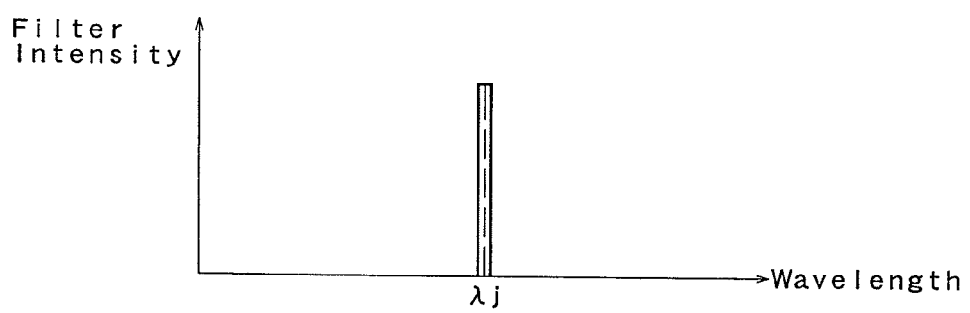

Moreover, in the LCOS element 25A, the filter configuration can be determined freely by adjusting the number of pixels to be brought into an ON state as well as an OFF state. That is, in FIG. 7A, by selecting one of the pixels placed in a 3×3 arrangement corresponding to a specific wavelength band of a specific inout number, it is possible to keep the filter at a low level in respect of its transmittance. Further, by selecting part of the 9 pixels covering the wavelength band $\lambda_j$ of the inout number i in the LCOS element 25A, it is possible to obtain a desired wavelength. In this way, when light is incident on the LCOS element 25A, a passband width corresponding to the width of the reflection region can be obtained. That is, as shown in FIG. 7B, out of the 9 pixels covering the wavelength band $\lambda_j$ of the input number i, centrally located 3 pixels are brought into a transmissive state. This makes it possible to attain narrow-range selection characteristics as shown in FIG. 8B for selecting wavelengths forming central portions of the wavelength band $\lambda_j$.

Figure 7C:
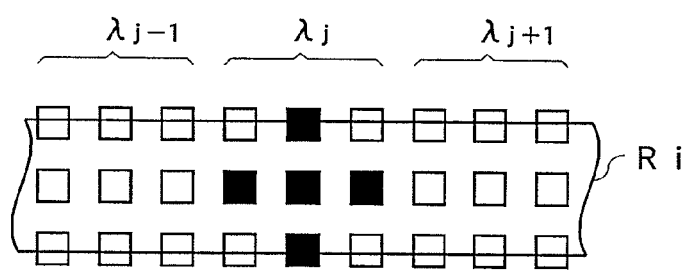
Figure 8C:
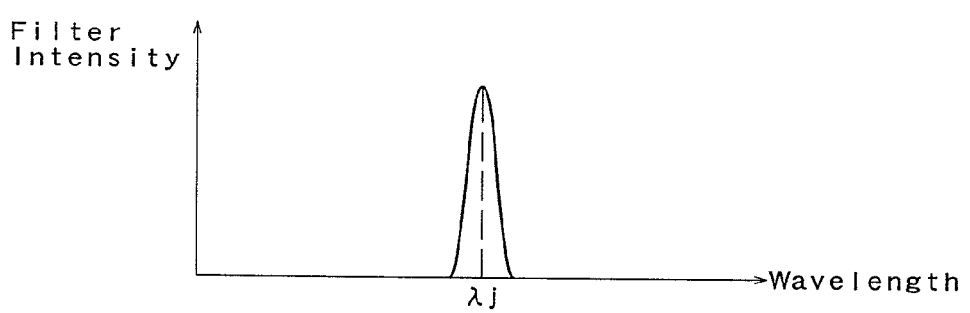

Moreover, as shown in FIG. 7C, pixels adjacent to the central 3 pixels are also brought into a transmissive state at the same time. This makes it possible to attain near-Gaussian selection characteristics as shown in FIG. 8C in which the passband is slightly widened.

Figure 7D:
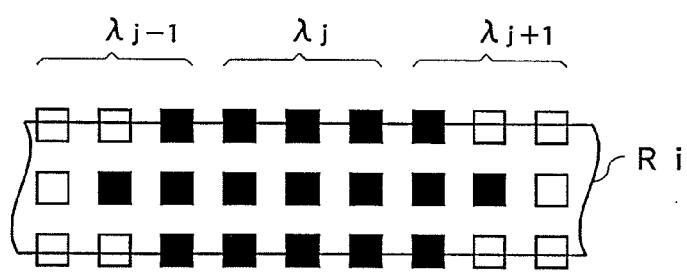
Figure 8D:
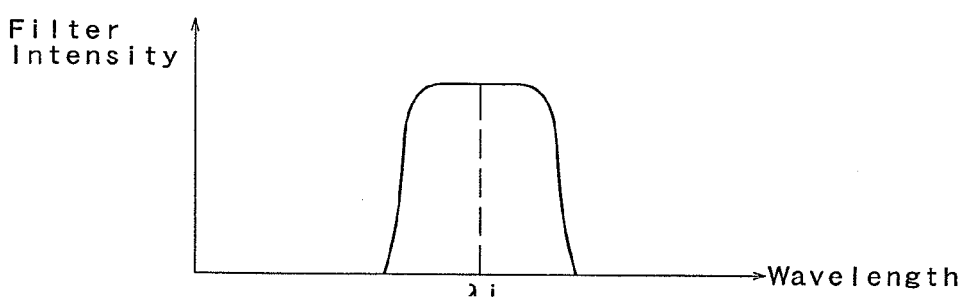

Further, as shown in FIG. 7D, in addition to the 9 pixels covering the wavelength band $\lambda_j$, part of the pixels adjacent thereto is also brought into a transmissive state. This makes it possible to render the passband even wider as shown in FIG. 8D.

In this embodiment, the optical cross connect switch 10A is formed of N splitters 11-1 to 11-N and M (N×1) optical switches 12-1 to 12-M. These components are very simple, low level functional parts as compared to a wavelength selective switch, it is possible to lower a failure rate, achieve a compact mounting area and improve transmission reliability.

Further, the wavelength selector 20A of the present invention is configured such that it is hard to be affected by external perturbations such as vibrations and shocks without using the movable parts.

The transmittance can be continuously varied by adjusting the level of a voltage to be applied to each of the pixels of the LCOS element 25A. Accordingly, by controlling pixels subjected to voltage application and voltage level, various filter characteristics can be attained.

Further, an equalization function can be achieved through monitoring output level of each wavelength of each WDM signal so as to keep a level of transmitted light uniform.

It is noted that, although the pixels placed in the 3×3 arrangement are assigned to each wavelength band of a single channel of a WDM signal in the first embodiment, by increasing the number of pixels to be assigned or by exercising voltage level control on a pixel-by-pixel basis, it is possible to control filter characteristics more precisely.

Second Embodiment

Next, a second embodiment of the present invention will be described. In this embodiment, as shown in FIG. 9, in an optical cross connect switch 10B, N (1×M) optical switches (OSW) 13-1 to 13-N are used in place of the splitters, and their outputs are inputted to M (N×1) optical switches 12-1 to 12-M. As compared to the embodiment using the splitters, this embodiment can prevent branch loss and improve efficiency. In this configuration, each of the N WDM signals inputted to the input routes Rin1 to RinN can be outputted to any one of the optical switches 12-1 to 12-M and fed to the wavelength selector 20B. The configuration of the wavelength selector 20B is the same as that of the wavelength selector 20A in the first embodiment. A controller 40B controls switching of the 1×M optical switches 13-1 to 13-N and N×1 optical switches 12-1 to 12-M, and filtering of a wavelength selector 20B. Also in this case, since the optical cross connect switch is configured of N+M optical switches, it is possible to lower a failure rate, achieve a compact mounting area and improve transmission reliability.

Third Embodiment

Although the transmission-type LCOS element is employed as the wavelength selector 20A in the first embodiment, a reflective type wavelength selector 20C may be used. In a third embodiment of the present invention, all components except wavelength selector 20C are same as those of the first embodiment.

Figure 10A:
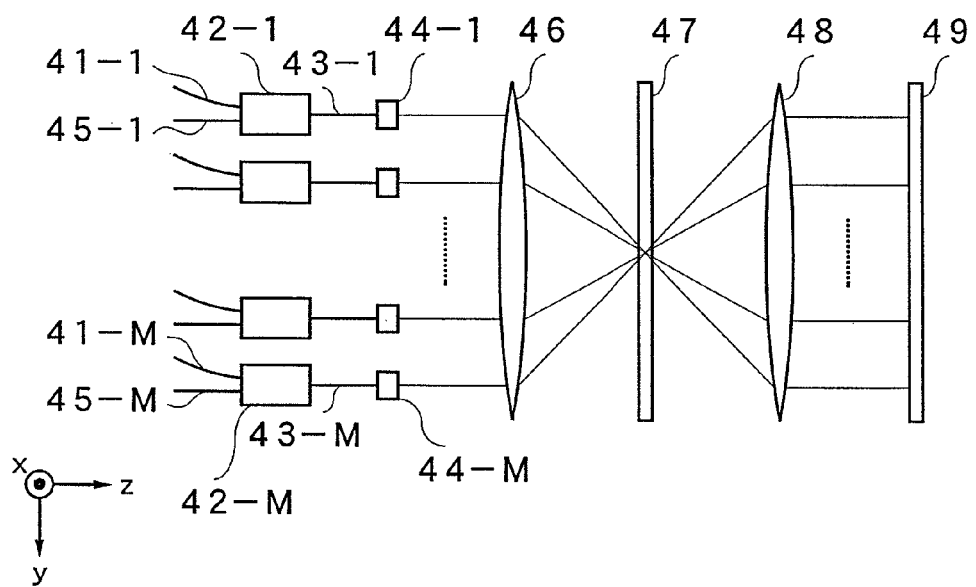
FIG. 10A is a diagram showing optical arrangement of a reflection-type wavelength selector employed in a third embodiment of the present invention as seen in the x-axis direction.
Figure 10B:
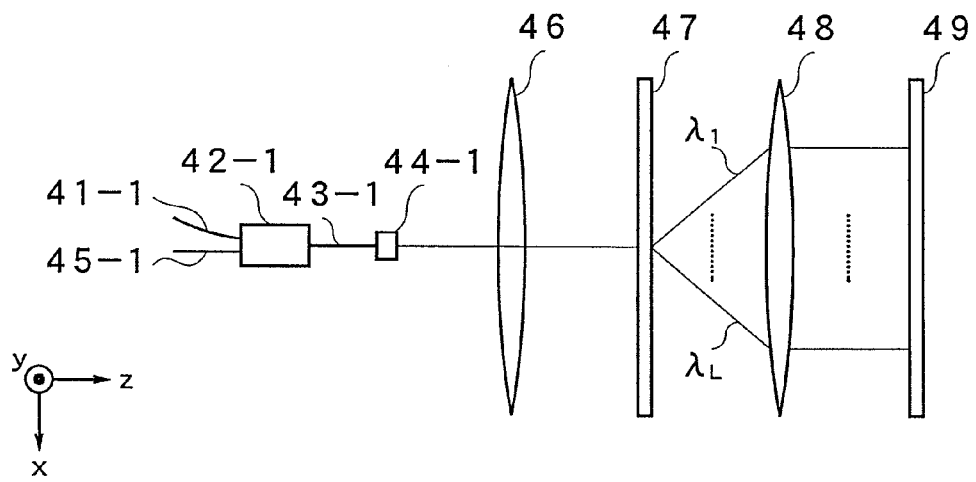
FIG. 10B is a diagram showing optical arrangement of the reflection-type wavelength selector employed in the third embodiment of the present invention as seen in a y-axis direction.

FIG. 10A is a side view showing the configuration of optical elements constituting a reflection-type wavelength selector 20C in accordance with a third embodiment of the present invention as seen in the direction of an x axis. FIG. 10B is a side view showing the apparatus as seen in the direction of a y axis. Incoming lights are WDM signals corresponding to M channels, and WDM light of each channel results from multiplexing of optical signals ranging in wavelength from $\lambda_1$ to $\lambda_L$. The beams of WDM light of M are fed, through optical fibers 41-1 to 41-M, respectively, to circulators 42-1 to 42-M, respectively. The beams of incoming light can be either inputted to their respective circulators 42-1 to 42-M via their respective optical fibers 41-1 to 41-M or inputted directly to the circulators. The circulators 42-1 to 42-M allow the incoming light beams to exit, through optical fibers 43-1 to 43-M, respectively, to collimator lenses 44-1 to 44-M, respectively, and also allow light beams coming from the optical fibers 43-1 to 43-M, respectively, to exit to optical fibers 45-1 to 45-M, respectively. Moreover, the light beams that exited from their respective collimator lenses 44-1 to 44-M via their respective optical fibers 43-1 to 43-M are parallel to each other in the direction of a z axis. The beams of WDM light of all the channels are condensed into a spot at a focal point by a lens 46 to enter a wavelength dispersion element 47 placed at the light condensing position. The wavelength dispersion element 47 acts to disperse light in different directions relative to the x-axis direction according to wavelengths. Herein the wavelength dispersion element 47 may be constructed of a transmission-type or reflection-type diffraction grating or a prism or the like, or may be constructed of a combination of a diffraction grating and a prism. The dispersed light beams from the wavelength dispersion element 47 are fed to a lens 48. The lens 48 is a light condensing element for condensing light beams dispersed on an xz plane in a direction parallel to the z axis. The condensed light is incident perpendicularly on a wavelength selection element 49.

It is noted that, in FIG. 10B, there are shown light having the shortest wavelength $\lambda_1$ and light having the longest wavelength $\lambda_L$ by way of example. However, incoming light is in reality WDM signal light having a multiplicity of spectra in a range from the wavelength $\lambda_1$ to the wavelength $\lambda_L$. Therefore the beams of WDM signal light corresponding to M channels developed over the xz plane are directed, in a strip-like form, to the wavelength selection element 49. The wavelength selection element 49 effects reflection of incoming light in a selective manner. The selection characteristics of the optical filter are determined on the basis of the reflection characteristics of the wavelength selection element 49. The light beams reflected from the wavelength selection element 49 pass through the same path to enter the lens 48, and are then directed to the wavelength dispersion element 47 once again. In the wavelength dispersion element 47, the reflected light is condensed in the same direction as the condensing direction of the original incoming light, and the condensed light is incident on the lens 46. The lens 46 turns the light into light beams parallel to the z-axis direction in the same path as that taken by the incoming light, and the light beams exit, through their respective collimator lenses 44-1 to 44-M, to their respective optical fibers 43-1 to 43-M. The light beams are then outputted to their respective optical fibers 45-1 to 45-M by their respective circulators 42-1 to 42-M. Herein the optical fibers 41-1 to 41-M, 43-1 to 14-M, and 45-1 to 45-M, the circulators 42-1 to 42-M, the collimator lenses 44-1 to 44-M, and the lens 46 constitute an entrance/exit section for receiving WDM signal light beams of M channels and allowing the exit of selected light. It is noted that the circulators 42-1 to 42-M do not necessarily have to be fiber-type circulators. When using spatial-type circulators, there is no need to provide the optical fibers 43-1 to 43-M.

Next, the wavelength selection element 49 employed in the reflection-type wavelength selector 20C can be achieved to change the abovementioned LCOS element to that of reflective type. A reflection-type LCOS element 49A has a built-in liquid crystal modulation driver located at the back of each pixel. Accordingly, the number of pixels can be increased. In the LCOS element 49A, since light beams are incident separately at different positions according to WDM signal and wavelength, by bringing a pixel corresponding to the incident position of a target light beam into a reflective state, it is possible to select the optical signal thereof.

In the LCOS element 49A, a plurality of pixels can be assigned to each wavelength band of a single channel of a WDM signal same as the LCOS element 25A, it is possible to control filter characteristics as shown in FIGS. 7 and 8.

Figure 11A:
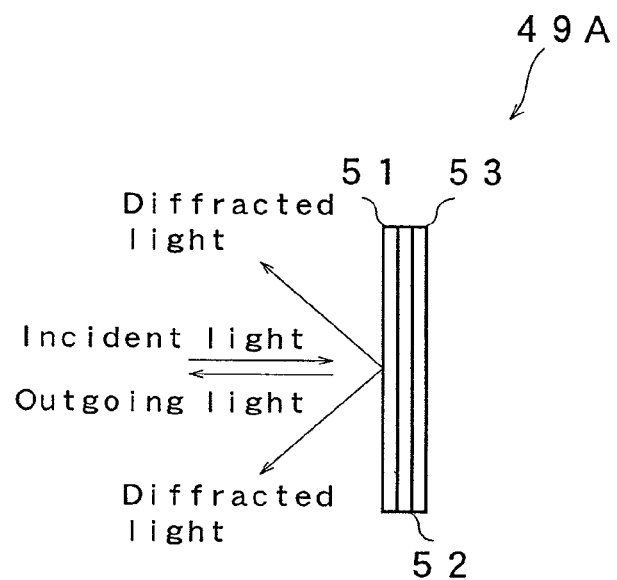
FIG. 11A is a diagram showing an example of a modulating mode for an LCOS element employed in the third embodiment of the present invention.

Now, as one of modulation modes applicable to the LCOS element 49A, a phase modulation mode will be explained. FIG. 11A is a schematic diagram showing the LCOS element 49A. The LCOS element 49A is composed of a transparent electrode 51, a liquid crystal 52, and a back reflection electrode 53 that are arranged in the order named, from the plane of incidence's side, along the z-axis direction in a layered structure. In the LCOS element 49A, since a plurality of pixels are assigned to constitute a single wavelength band of a single channel, it is possible to impart unevenness to a refractive index profile with respect to a plurality of pixels and thereby develop a diffraction phenomenon. Accordingly, by applying a voltage between the transparent electrode 51 and the back reflection electrode 53, the angles of diffraction of different frequency components can be controlled independently, so that input light with a specific wavelength can be simply reflected in the incident direction, and light of another wavelength components can be diffracted as unnecessary light and reflected in a direction different from the incident direction. Therefore, by controlling a voltage to be applied to each pixel, necessary pixels can be brought into a regularly-reflective state without causing diffraction.

Figure 11B:
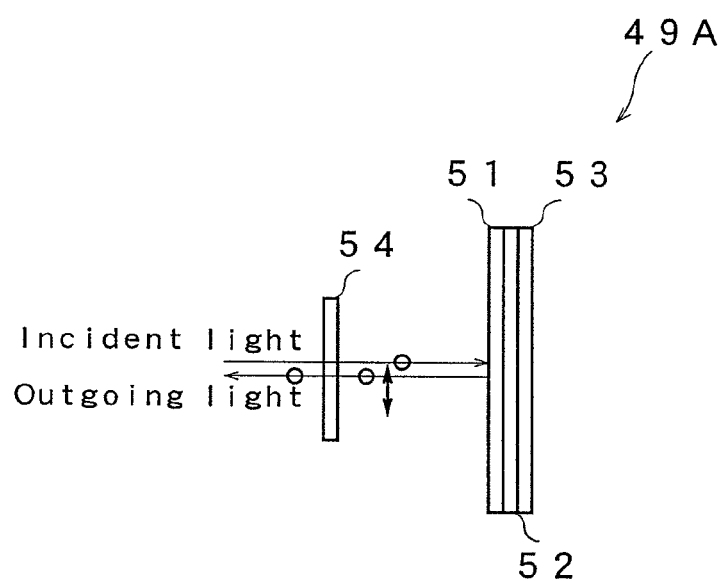
FIG. 11B is a diagram showing another example of the modulating mode for the LCOS element employed in the third embodiment of the present invention.

Next, as another modulation mode applicable to the LCOS element 49A, an intensity modulation mode will be explained. FIG. 11B is a diagram showing a wavelength selection method based on the intensity modulation mode. A polarizer 54 is placed on the plane of incidence for incoming light and outgoing light as well. The polarizer 54 brings incoming light into a specific polarized state as indicated by an circle in the diagram, and the polarized light is incident on the LCOS element 49A of reflection type. Also in this case, the LCOS element 49A is composed of a transparent electrode 51, a liquid crystal 52, and a back reflection electrode 53. With the incidence of light on the LCOS element 49A, a difference in index of double refraction in the liquid crystal between the electrodes can be controlled on the basis of the conditions of voltage application. Accordingly, the polarization state of reflected light can be varied by adjusting to-be-applied voltages independently. Then, it is determined whether the plane of polarization is rotated or retained at the time of voltage control in accordance with orientational ordering among liquid-crystal molecular components. For example, assuming that the plane of polarization is retained in the absence of voltage application, then the light indicated by the circle is simply reflected. On the other hand, in the presence of voltage application, the plane of polarization is rotated to effect reflection, and the reflected light is shielded by the polarizer 54. Therefore the selection of incoming light can be achieved by controlling voltages to be applied to the pixels. The selection of a plurality of given wavelength bands of a plurality of given WDM signal light beams can be made by bringing a given number of corresponding pixels into a reflective state.

In the third embodiment, the wavelength selector of the first embodiment has changed to a reflective-type selector, the wavelength selector 20B of the second embodiment may change to that of reflective-type.

The transmittance can be continuously varied by adjusting the level of a voltage to be applied to each of the pixels of the LCOS element 49A. Accordingly, by controlling pixels subjected to voltage application and voltage level, various filter characteristics can be attained.

Further, by increasing the number of pixels to be assigned or by exercising voltage level control on a pixel-by-pixel basis, it is possible to control filter characteristics more precisely.

Figure 12:
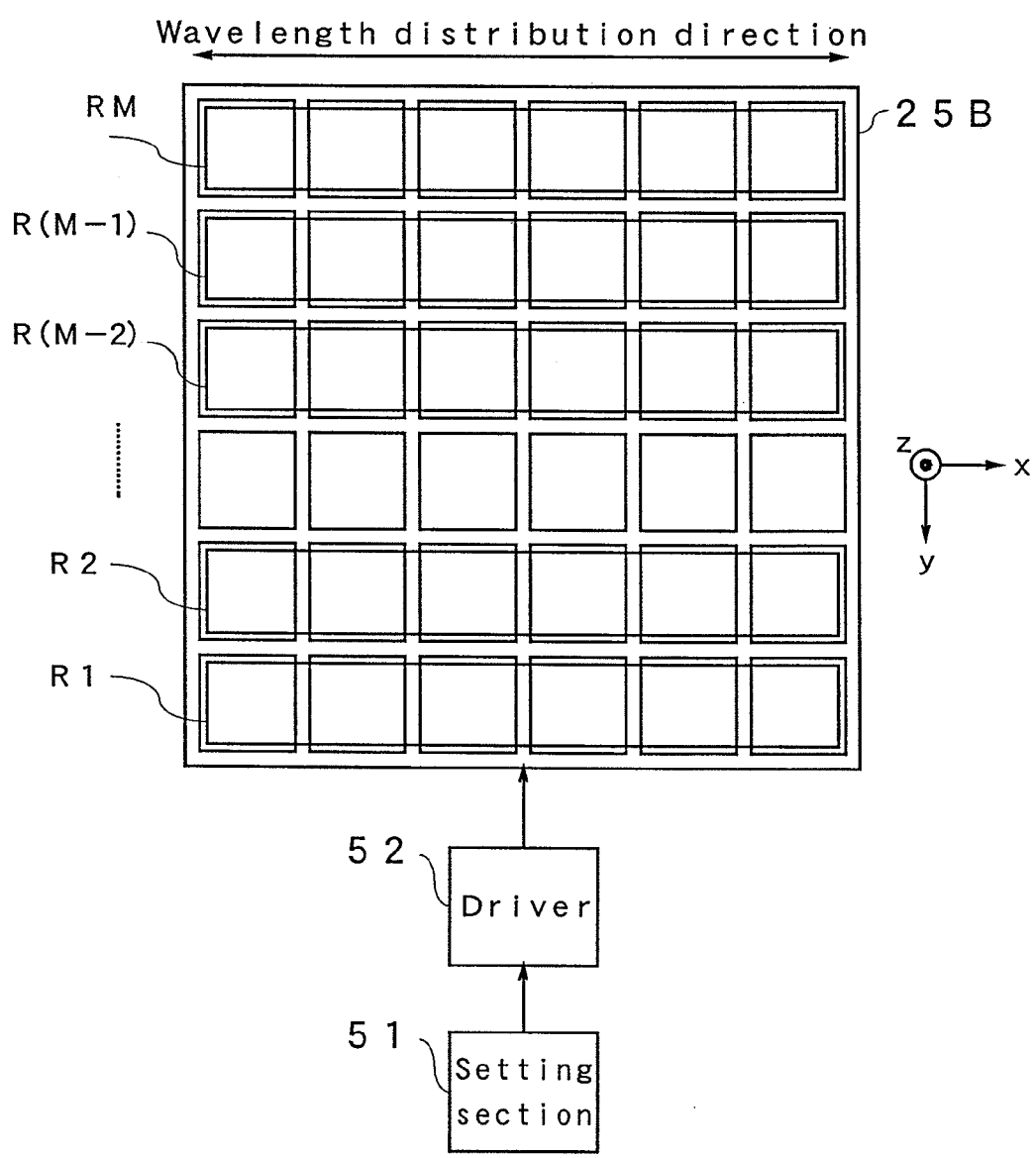
FIG. 12 is a diagram showing another example of a wavelength selection element of the present invention.

Moreover, as the wavelength selection element 25 in the first and second embodiments, a liquid crystal element 25B can also be used that has a 2D electrode array instead of a LCOS structure. In the LCOS element, there is incorporated a liquid crystal driver located at the back of each pixel. On the other hand, in the 2D-electrode array liquid crystal element 25B, a driver 52 for liquid crystal modulation is disposed externally of the element. This makes it difficult to provide as many pixels as provided in the LCOS element. Accordingly, it is desirable to adopt a L×M pixel arrangement as shown in FIG. 12 in conformity with a two-dimensional L×M development of n wavelengths ranging from $\lambda_1$ to $\lambda_L$ of WDM light corresponding to M input WDM signals. In this case, although the filter configuration cannot be changed, desired one or more wavelength bands from one WDM signal can be selected. Moreover, in this case, only the foregoing intensity modulation mode can be implemented. Further, the level of transmission can be varied by making changes to the level of voltages to be applied to the pixels.

Moreover, in the third embodiment, a liquid crystal element having a 2D electrode array can also be used instead of the LCOS element 49A.

Although the LCOS wavelength selection element 25A or wavelength selection element 49A is used as the wavelength selector in first to third embodiments, as shown in FIG. 13, M wavelength blockers 20C-1 to 20C-M may be provided with respect to first to $M^{th}$ inputs to constitute the wavelength selector. The wavelength blocker is an element capable of transmitting or blocking desired wavelengths of a WDM signal light. Also in this case, a level of wavelength band in which light is transmitted can be made uniform by detecting a signal level of each wavelength by use of a power monitor and controlling outputs.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese application No. 2010-142646 filed on Jun. 23, 2010 is hereby incorporated by reference.

What is claimed is:

1. A multiple input/output wavelength selective switch device for inputting wavelength division multiplexing optical signals (hereinafter referred as WDM signals) of first to $N^{th}$ channels, the signals each having wavelengths $\lambda_1$ to $\lambda_L$ (L is a natural number of 2 or more), to N input routes (N is a natural number of 2 or more) and outputting the wavelength multiplexing optical signals of desired channels from M output routes (M is a natural number of 2 or more) comprising:

an optical cross connect switch for outputting desired M WDM light beams among the WDM signals of N channels inputted to the N input routes; and a wavelength selector for receiving inputs of the M outputs from said optical cross connect switch, selecting an optical signal of desired wavelengths with respect to each of the inputted WDM signals and outputting the selected signals as M WDM signals, wherein said optical cross connect switch includes:

N splitters for branching each of the WDM signals inputted to said input routes into M outputs; and M (N×1) optical switches each for receiving inputs of all outputs of said splitters and selecting one of the inputs, wherein said wavelength selector includes:

a first dispersion element arranged along a direction of a y axis, the element spatially dispersing first to $M^{th}$ WDM signal light beams having a plurality of wavelengths according to their wavelengths;

a first light condensing element for condensing the WDM light beam of each channel dispersed by said first dispersion element into parallel light beam;

a wavelength selection element having a multiplicity of pixels arranged in a direction of an x axis according to wavelength, the pixels being placed so as to receive M WDM light beams arranged at different positions with respect to the y axis so as to be developed over an xy plane and being arranged in a lattice pattern on the xy plane, and the wavelength selection element selecting light in desired wavelength bands with respect to desired WDM signals by changing transmission characteristics of each of the pixels arranged in a two-dimensional fashion;

a wavelength selection element driving unit for driving electrodes arranged in xy directions of said wavelength selection element to control light transmission characteristics of a pixel lying at a predetermined position in the x-axis direction as well as in the y-axis direction;

a second light condensing element for condensing light beams of different wavelengths transmitted through said wavelength selection element; and a second wavelength dispersion element for synthesizing dispersed light condensed by said second light condensing element.

2. The multiple input/output wavelength selective switch device according to claim 1, wherein said wavelength selection element is an LCOS element.

3. The multiple input/output wavelength selective switch device according to claim 1, wherein said wavelength selection element is a two-dimensional liquid crystal array element.

4. A multiple input/output wavelength selective switch device for inputting wavelength division multiplexing optical signals thereinafter referred as WDM signals) of first to $N^{th}$ channels, the signals each having wavelengths $\lambda_1$ to $\lambda_L$ (L is a natural number of 2 or more), to N input routes (N is a natural number of 2 or more) and outputting the wavelength multiplexing optical signals of desired channels from M output routes (M is a natural number of 2 or more) comprising:

an optical cross connect switch for outputting desired M WDM light beams among the WDM signals of N channels inputted to the N input routes; and a wavelength selector for receiving inputs of the M outputs from said optical cross connect switch, selecting an optical signal of desired wavelengths with respect to each of the inputted WDM signals and outputting the selected signals as M WDM signals, wherein said optical cross connect switch includes:

N splitters for branching each of the WDM signals inputted to said input routes into M outputs; and M (N×1) optical switches each for receiving inputs of all outputs of said splitters and selecting one of the inputs, wherein said wavelength selector includes:

a plurality of entrance/exit section arranged along a direction of a y axis, the entrance/exit section receiving first to Mth WDM signal light beams, each of which is composed of multiple-wavelength light, and exiting optical signals of selected wavelengths on a channel to channel basis;

a wavelength dispersion element for spatially dispersing the M WDM signal light beams obtained from said entrance/exit section according to their wavelengths;

a light condensing element for condensing the WDM signal light beams of different channels dispersed by said wavelength dispersion element on a two-dimensional xy plane;

a wavelength selection element having a multiplicity of pixels arranged in a direction of an x axis according to wavelength, the pixels being placed so as to receive M WDM light beams arranged at different positions with respect to the y axis so as to be developed over the xy plane and being arranged in a lattice pattern on the xy plane, and the wavelength selection element selecting light in desired wavelength bands with respect to desired WDM signals by changing reflection characteristics of each of the pixels arranged in a two-dimensional fashion; and a wavelength selection element driving unit for driving an electrode of each of the pixels arranged in xy directions of said wavelength selection element to control light reflection characteristics of a pixel lying at a predetermined position in the x-axis direction as well as in the y-axis direction.

5. The multiple input/output wavelength selective switch device according to claim 4, wherein said wavelength selection element is an LCOS element.

6. The multiple input/output wavelength selective switch device according to claim 4, wherein said wavelength selection element is a two-dimensional liquid crystal array element.

* * * * *